United States Patent [19]

Stark

[11] Patent Number: 5,963,030
[45] Date of Patent: Oct. 5, 1999

[54] PIPE INSPECTION APPARATUS AND PROCESS

[75] Inventor: Mitchel A. Stark, Makati, Philippines

[73] Assignee: Union Oil Company of California, El Segundo, Calif.

[21] Appl. No.: 09/050,697

[22] Filed: Mar. 30, 1998

[51] Int. Cl.$^6$ ........................................... G01B 7/06
[52] U.S. Cl. .................. 324/229; 324/229; 324/228; 324/230; 324/231; 324/233; 324/236; 324/237; 324/238; 324/239; 324/240; 324/260; 324/262; 73/637; 73/865.8
[58] Field of Search ........................... 324/229, 228, 324/230, 231, 233, 236, 237, 238, 239, 240, 260, 262, 261; 73/637, 865.8

[56] References Cited

U.S. PATENT DOCUMENTS

| | | | |
|---|---|---|---|
| 4,467,281 | 8/1984 | Davis et al. | 324/232 |
| 4,555,665 | 11/1985 | Stanley et al. | 324/229 |
| 4,620,152 | 10/1986 | Bains, Jr. | 324/225 |
| 4,629,985 | 12/1986 | Papadimitriou et al. | 324/232 |
| 4,640,359 | 2/1987 | Livesey et al. | 166/276 |
| 4,835,873 | 6/1989 | Weems | 33/21.3 |
| 4,955,645 | 9/1990 | Weems | 285/355 |
| 5,024,275 | 6/1991 | Anderson et al. | 166/303 |
| 5,091,696 | 2/1992 | Koosen | 324/229 |
| 5,157,977 | 10/1992 | Grubbs | 73/866.5 |
| 5,420,427 | 5/1995 | Morgan et al. | 250/360.1 |
| 5,442,287 | 8/1995 | Kammann et al. | 324/242 |
| 5,568,448 | 10/1996 | Taniqushi et al. | 367/82 |
| 5,585,565 | 12/1996 | Glascock et al. | 73/644 |

OTHER PUBLICATIONS

ABB Vetco Gray Company History, 1997, pp. 1–3. Web Site webmaster@abbvetcogray.com Date Not Available.

Tubuscope Vetco International, Technical Data of Vetcolog; Dimensions of Vetcolog; the Application; The Service. Date Not Available.

*Primary Examiner*—Jay Patidar
*Attorney, Agent, or Firm*—Gregory F. Wirzbicki; William O. Jacobson

[57] ABSTRACT

An openable ring assembly is externally centered around and moved parallel to the centerline of a stationary pipe. As a low-frequency EM source signal is applied to the ring assembly, the time and/or frequency shifts of a detected EM signal from the source signal can be correlated to pipe wall thickness without removal of external pipe insulation and metal cladding, if present. The ring assembly may be opened or expandably segmented to allow pipe thickness detection around obstructions or larger diameter pipe. Centering is preferably accomplished by using rollers circumferentially attached to the ring assembly.

22 Claims, 2 Drawing Sheets

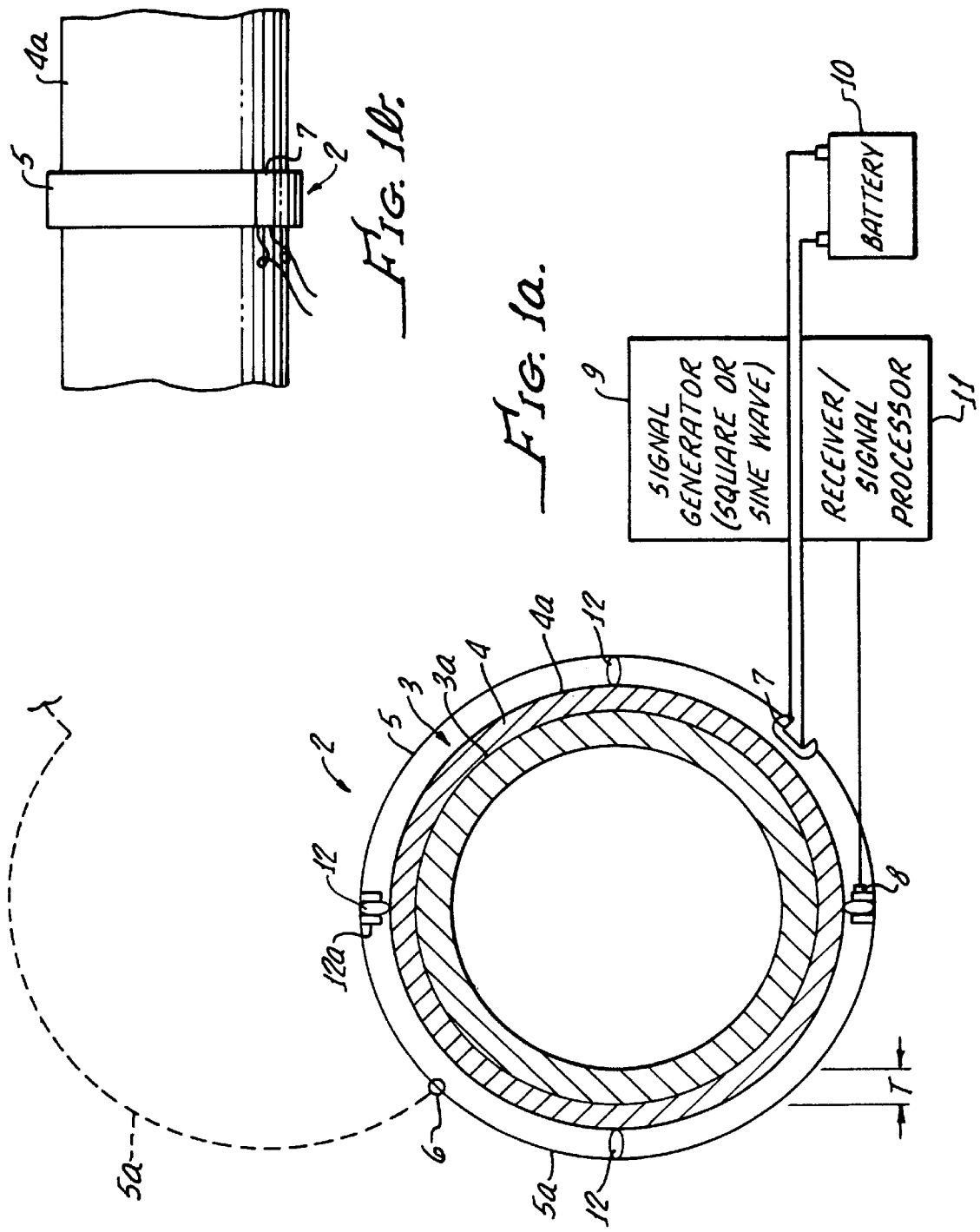

PIPE INSPECTION APPARATUS AND PROCESS

FIELD OF THE INVENTION

This invention relates to pipe inspection devices and processes. More specifically, the invention provides a detecting device located external to an insulated piping system, and a method for inspecting the wall thickness of the piping system using the detecting device.

BACKGROUND OF THE INVENTION

Many industrial facilities have piping systems and assemblies handling fluids that are corrosive and/or erosive to conventional piping materials of construction such as steel. In some piping systems, more costly corrosion-resistant materials of construction are used for the pipe assemblies handling these fluids. In other applications, the initial wall thickness of a steel piping system is increased to allow for a loss of thickness from corrosion and erosion without compromising the safe handling of the fluid within the piping system. Periodic inspections of conventional and corrosion-resistant piping systems are typically accomplished at these and other facilities to ensure that the remaining wall thickness is at least up to the minimum standards for safety.

In some corrosive/erosive applications, the handled fluids or fluid-like materials are hot, typically requiring the exterior of the piping to be insulated. Visual or other pipe inspection methods requiring access to or contact with the pipe wall must therefore include the removal of the exterior insulation or the use of inspection devices placed within the pipe. Removal of all insulation may not only be costly, but may damage the insulation. If pipe inspections are conducted at specific points, small plugs of insulation are typically removed to allow access to these points on the pipe. However, these point inspection methods may fail to detect substandard pipeline conditions that occur beyond the inspection points.

A hot corrosive fluid contained within the piping system may essentially preclude the use of some inspection devices placed within the pipe. If the pipe interior is lined, interior visual or contact inspection of the piping may also be precluded. Even if not precluded, interior inspections of piping may require costly process or facility shutdowns.

Several electromagnetic (EM) testing techniques have been employed which do not require direct pipe access or contact. These include magnetic flux methods and eddy current devices. In one type of magnetic flux method as described in U.S. Pat. No. 4,555,665, a coil is wrapped around a pipe and a saturating DC current is supplied to the coil while the pipe-disturbed magnetic flux in the proximity of the pipe is detected and correlated to average wall thickness.

An intermediate- or high-frequency EM signal source is typically used in an eddy current device to induce eddy currents in the nearest surface of a pipe and the detected eddy currents are correlated to defects at that surface. Several intermediate- or high-frequencies may be used, for example as described in U.S. Pat. No. 4,467,281, frequencies ranging from 25 kHz to 1.6 MHz. In some eddy current devices, low-frequency signals are filtered out to provide better resolution of the intermediate or high frequency signals representative of surface or near-surface eddy currents and the impacts of surface defects on these eddy currents.

Both the magnetic flux and eddy current methods require relatively close proximity of EM coils and/or detectors to the pipe. At further distances from the pipe, the magnetic flux distortion caused by the pipe will not be detectable and thus the thickness of the pipe will be unmeasured by the magnetic flux method. Also, at larger distances from the pipe, the intermediate or high frequency signal of an eddy current device will be insufficient to generate detectable eddy currents in the surface of the pipe to be inspected. In addition to the proximity requirement, the presence of intervening conductive and/or non-conductive materials will adversely impact these methods. For example, if used on insulated pipe covered by a metal jacket, the eddy current device would detect defects in the outside jacket surface instead of the outside pipe surface.

SUMMARY OF THE INVENTION

In accordance with the invention, a low frequency electromagnetic (EM) source and detector apparatus having an external loop-like structure or ring assembly is used to inspect the wall of a stationary pipe without having to remove exterior pipe insulation. The ring assembly traverses the pipe while the assembly is nominally centered coaxial with the pipe by a centering element, and a low-frequency EM source signal or current is impressed to flow in the wire or wires that are part of the ring assembly. The source signal or current induces a secondary EM signal/current within the piping to be inspected, which in turn induces a detectable change in the EM signal/current within the ring assembly. The time and/or frequency response of a detected EM signal can be correlated to pipe thickness, e.g., a measured pipe thickness is related to the detected EM signal. The presence of EM non-conductive and/or EM conductive materials (such as insulation and cladding) between the ring assembly and the pipe has little effect on the detected low frequency signal or the effect can be corrected out. The ring assembly can also be opened or expanded to allow it to pass over or around pipe supports or other external obstructions, in some cases while still detecting wall thickness changes. In alternative embodiments, other pipe inspection devices can also be attached to the ring assembly.

The preferred pipe inspection apparatus and process uses a wire or other conductor element in the ring-like assembly to detect EM signals dependent upon the thickness of an EM conductive pipe as it is slowly traversed by the ring assembly along a direction parallel to the centerline of the pipe. A low frequency electromagnetic source signal is generated as the ring assembly traverses along the pipe, inducing signals in the wall of the conductive pipe as well as other near-by conductive materials. The resulting electromagnetic signal in the ring assembly (e.g., caused by the interaction of the source signal with pipe-induced signals) is preferably detected in the wire itself and correlated to the thickness of the pipe to provide a measurement of average pipe thickness. The recorded signal and the measured pipe thickness are typically logged and the logged data are used to evaluate the condition of the pipe at the time of the survey. In addition, periodic surveys enable the detection of significant changes in pipe condition.

BRIEF DESCRIPTION OF THE DRAWINGS

FIG. 1a shows a cross-sectional schematic of a detector ring assembly surrounding most of an insulated pipe;

FIG. 1b shows a side view of the detector ring assembly around an insulated pipe to be inspected;

In these Figures, it is to be understood that like reference numerals refer to like elements or features.

DETAILED DESCRIPTION OF THE INVENTION

Figure 2A:
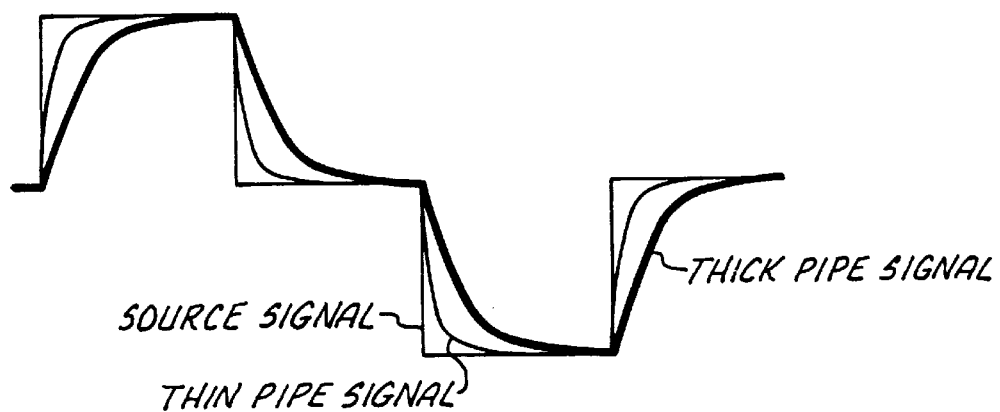
FIG. 2a shows an EM signal trace for time domain mode detection.

FIG. 1a shows a schematic with a cross-sectional view of a loop-like or ring assembly 2 and FIG. 1b shows a side view of the ring assembly centered around a pipeline or pipe assembly 3. The ring assembly 2 includes a loop-like wire coil or conductive partial ring 5 having a single or multiple turns of EM conductive wire, a hinge or openable means 6, an optional clamp or other connector means 7, and rollers 12 or other means for centering the coil 5 around the pipe assembly 3 while allowing the coil to be moved along a length of the pipe assembly. Preferably, an optional distance logging galvanometer 8 is also attached to the ring assembly 2 for recording the distance moved or traversed by the ring assembly. Shown schematically as electrically connected to the ring assembly 2 is an EM signal generator 9 or other means for supplying a periodic and/or low frequency EM signal, a battery 10 or other means of supplying electric power, and an EM signal receiver 11 or other means for detecting an EM signal. The battery 10 supplies power to the detecting means 11 and signal generator 9.

The wire coil 5 is shown in solid lines in a closed position as a discontinuous and expandable loop with electrical leads to the signal generator 9, signal receiver 11, and battery 10. However, the optional connector 7 can be a conductive element to make the discontinuous wire coil 5 and connector act as an electrically continuous wire ring. The wire coil 5 is preferably almost cylindrical in a shape partially enclosing the pipe assembly 3 and is composed of copper wire, but various shapes, cross-sectional wire geometries, and other electrically conductive or EM semiconductive materials can also be used. For example, a thin gauge wire coil 5 can be used with a nearly oblong shaped, non-conductive stiffener or structure supporting the wire coil in a discontinuous loop around the pipe assembly.

The wire coil 5 in the closed or nearly closed position must have an inside clearance dimension or a nearly cylindrical diameter equal to or greater than the nominal outside diameter of the pipe assembly 3, which include the insulation 4 and metal jacket or cladding 4a. The clearance dimensions allow the closed wire coil 5 to traverse or otherwise be moved over the cladding 4a of pipe assembly 3 in a direction generally parallel to the centerline of the pipe 3a. The generally annular space between the wire coil 5 and the pipe assembly 3 is normally sufficient to allow the wire coil to pass over pipe connectors and smaller protrusions such as gauges, but does not allow the wire coil to traverse larger protrusions, such as pipe supports, without further action.

When the ring assembly 2 is in the closed or nearly closed position, the two semicircular segments 5a of the wire coil 5 form a nearly cylindrical, but electrically discontinuous ring or loop-like shape around the pipe assembly 3. However, the induced signals or currents are similar to those induced by a continuous ring or closed loop because of the nearly closed position of the ring assembly 2 and the EM field extending beyond the physical ends of the discontinuous wire coil 5. Alternatively, the segments 5a may have shapes other than semicircular, and the resulting loop-like shape may be substantially elliptical, cardioid, or other shape capable of partially, substantially, or fully enclosing the pipe assembly 3.

Preferably, the ring assembly 2 is manually centered and rolled on rollers 12 while obtaining real-time readouts of the wall thickness of the pipe 3a, but alternative means for moving and centering the ring assembly over pipe assembly 2 can also be used. Such means include attached actuators, motorized traction devices on the ring assembly, and a drum driven rope to pull the ring assembly. Since the selected means for centering and the selected means for traversing or moving the ring assembly must function concurrently, alternative means for traversing which provide added moving force (such as drum driven ropes) may be preferred to move the ring assembly 2 if a centering means is used which does not include rollers 12.

The preferred velocity for traversing the pipe 3a with the ring assembly 2 is related to the periodic or low frequency nature of the source signal. Traverse velocity or speed will be limited by the low frequency operation in order to assure that a sufficient number of data cycles is obtained over a section of pipe 3a so that the resulting data has an acceptable quality. The low operating frequency, in turn, will be determined based on the wall thickness and other properties of the particular pipe and insulation configuration being surveyed. Although traverse velocities of 20 cm/sec or more are possible, a screening traverse velocity of no more than about 8 to 12 cm/sec is typical, and a traverse velocity of no more than about 1 to 3 cm/sec is typical for inspections of obstructions or areas where corrosion/erosion is most likely. For confirmation of a detected anomaly or wall thinning, traverse velocities approaching a stationary mode are more typical, e.g., a traverse velocity of no more than about 0.5 cm/sec.

The pipe assembly 3 includes the pipe 3a to be inspected, the external insulation 4 and optional insulation cladding 4a. The inspected pipe 3a must be made of a material such that a detectable signal/current is induced by the EM source signal in the ring assembly 2, which in turn induces a modification to the signal in the ring assembly 2. A conventional steel pipe would meet this requirement, but aluminum, copper, some plastics, some composites, some concretes, and other electrically conductive or semiconductive pipe materials can also be inspected by this method.

For corrosive environments, the initial thickness "T" of the pipe may include a corrosion allowance, i.e., a portion of the wall thickness of the pipe as originally installed that can corrode away without endangering people or nearby equipment. However, when corrosion proceeds to remove more metal than the corrosion allowance leaving less than a minimum pipe wall thickness, the pipe can no longer be safely used in the corrosive application. The apparatus of the invention provides a means for detecting and measuring the remaining thickness of pipe 3a without removing insulation 4. The measured wall thickness "T" can then be compared to the minimum pipe wall thickness and any remaining corrosion allowance.

The preferred insulation 4 is composed of any suitable thermal insulating material or combination of materials covered by an optional containment jacket structure or cladding 4a. The insulating material(s) can include low thermal conductivity materials such as foamed-in-place plastic, concrete, pearlite, or fiberglass. Any suitable structural material may be used for the cladding 4a, but a sheet metal resistant to atmospheric corrosion is typically used, e.g., aluminum or galvanized steel sheets formed around the insulation 4. However, neither the insulation nor the cladding need be present for the thickness detection method to work.

Rollers 12 are rotatively mounted on electrically insulated supports 12a that are attached to the ring assembly 2. The rollers 12 center the ring assembly 2 around the centerline of the pipe assembly 3 (which centerline is perpendicular to the plane of FIG. 1a) as the ring assembly traverses the pipe assembly substantially parallel to the centerline of the pipe 3a. In the embodiment shown, at least one of the rollers 12 contacts the metal jacket 4a, but does not contact the pipe 3a. In an alternative embodiment, instead of being mounted on supports 12a, the rollers 12 are rotatively mounted on a plurality of springs or other bias elements tending to maintain rolling contact between the rollers 12 and the metal jacket 4a while centering the pipe assembly 3 within the ring assembly 2. In still other alternative embodiments, the means for centering the ring assembly 2 around the pipe assembly 3 can include: elastic or elastomeric feelers attached to the ring assembly (allowing sliding and centering contact as the ring assembly is moved along the cladding 4a), centralizers attached to the ring assembly, a pipe-parallel track contacted by the ring assembly, a wheeled buggy or other rolling means for producing rolling contact with the cladding and ring assembly but not attached to the ring assembly, annular distance tracker/detectors and centering actuators attached to the ring assembly, and magnetic or electromagnetic repelling/attracting devices attached to the ring assembly 2 tending to center the ring assembly around the pipe. All centering means must preclude substantial electrical conduction between the pipe 3a and the ring assembly 2.

Optional connector 7 connects the openable ends of semicircular segments 5a distal from the hinge 6. The connector 7 may be composed of a suitable structural material that is substantially electrically conductive or non-conductive. In the preferred embodiment, the connector is composed of substantially non-conductive materials and functions only to maintain the structural shape and integrity of the ring assembly 2 as it is passed over pipe assembly 3 while allowing, when the connector is removed and/or replaced with a larger connector, the ring assembly to be opened around hinge 6. The removal of the connector 7 and the opening of ring assembly 2 around the hinge 6 allow the ring assembly 2 to be passed over/around obstructions such as pipe supports. In alternative embodiments, the coil 5 and hinge 6 are rigid enough to maintain the ring assembly 2 in a near circular configuration without the use of an optional connector. In still other embodiments, an alternative electrical connector 7 can include electrical connections which, when closed, allow current flow in series around multiple turns of wire in the ring assembly. The alternative electrical connector 7 may or may not also include electrical connections from the electrically-connected wire ring 5 to the signal generator 9, battery 10, and receiver 11.

The hinge or hinge point or other openable element 6 rotatively attaches the two approximately semicircular elements 5a and allows the ring assembly 2 to be placed onto and/or removed from around the pipe assembly 3 when one of the elements 5a is opened as shown dotted in FIG. 1a. The hinge 6 is preferably a pinned rotating assembly that is spring biased towards a closed position of the ring assembly. Alternative openable elements that may be used include a flexible member which allows the ring assembly 2 to be opened at many points without the need for a pinned hinge element, a plurality of hinge points on an articulated ring member, a pivoting connector, and a second connector similar to optional connector 7 which allows disconnection and removal of a semicircular or other removable element of an alternative ring assembly. The hinge 6 or other openable element typically also incorporates at least one electrical connection and may include multiple electrical connections to allow periodic current flow in multiple turns of wire in the ring assembly 2. The preferred hinge 6 also includes means for minimizing stress on the wire or wires of coil 5 during opening and closing of the hinge, such as a retainer molded to hold the wire or wires in each segment of the wire coil 5 loosely separated during opening and closing, electrical connections through an immobile surface of the hinge, or sliding point electrical contacts in the hinge.

An alternative ring assembly for use in the invention includes one or more insertable loop segments either in place of or in addition to the semicircular loop elements 5a shown in FIG. 1a. An additional insertable loop segment would expand the minimum clearance dimension or inside diameter of the ring assembly 2 allowing it to traverse larger obstacles while still obtaining wall thickness inspection data. In still other expandable embodiments, insertable loop segments would form an expandable structure around which a fixed length wire would be coiled, e.g., having fewer coils for larger clearance dimension or inside diameter loop structures and a larger number of coils for smaller dimension or diameter loop structures.

In some embodiments of the invention, conventional pipe inspection devices can be incorporated or attached to the ring assembly 2. Examples of conventional non-contact inspection devices that may be used include eddy current, radiography, and neutron (i.e., n-ray) detectors. Inspection devices requiring contact or surface access may be used when a non-contact device indicates a potential problem and at least a portion of the insulation can be removed. Contact or access inspection devices include optical sensors (perhaps in combination with dye penetrant or other techniques to visually enhance a surface defect), hardness testers, and resistivity detectors.

Figure 2B:
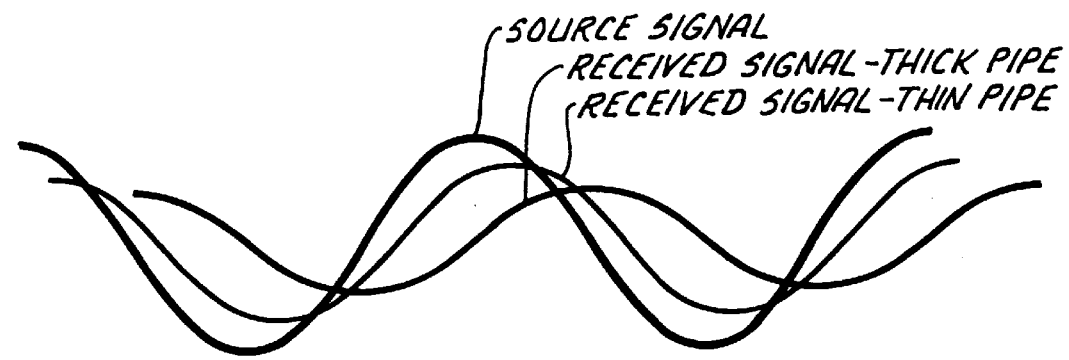
FIG. 2b shows an EM signal trace for frequency mode detection.

The preferred signal generator 9 is capable of producing a low frequency or periodic source signal in the form of a sine wave or a square wave when plotted as shown in FIGS. 2a and 2b. An alternative means for generating a suitable EM source signal could include an alternating current generator producing a waveform having other geometries when plotted.

The low frequency signal and the openable loop-like structure of the ring assembly 2 avoid many of the problems with using a DC magnetic flux or eddy current devices for inspecting externally insulated pipelines, especially those insulated pipelines with a metal cladding. For a typical 36 inch nominal diameter steel pipe having a wall thickness of about ½ inch and externally insulated for geothermal service, the low frequency source signal can range up to about 10,000 Hz or more, but more preferably ranges up to about 5000 Hz, still more preferably up to about 1000 Hz, and most preferably has a frequency no greater than about 250 Hz. Although low pressure (e.g., hot water at about 100 psig or less) and smaller diameter pipeline applications may allow higher frequencies, the frequency of the source signal is not expected to exceed 200 Hz for most externally insulated, steam or hot brine pipeline applications having a conductive metal cladding and is not expected to exceed 100 Hz for larger externally insulated pipelines having a conductive metal cladding. Frequencies of as low as 1 Hz or less are possible.

The preferred signal receiver 11 is electrically connected to the wire coil 5 and is capable of detecting and processing EM signals in the wire coil 5 within the frequency range generated by the signal generator 9, and the receiver is sensitive enough to detect the changes in the signal induced by the pipe 3a through any insulation and/or cladding, if present. The preferred signal receiver 11 includes a means to at least partially process and store the data, but the receiver 11 may only detect the signal near the coil and a separate means to process and/or a separate means to store the data could also be used. In the preferred embodiment, incoming signal data are converted within the receiver 11 from analog to digital signals and the digitized signals displayed or outputted to a computer for further data processing, display, storage and analysis. In an alternative embodiment, the receiver 11 incorporates a small computer capable of handling some of the real-time data processing prior to outputting to the external computer. Data may also be stored digitally on an internal or external digital data logging device, and/or in analog form on an external paper chart or tape recorder, or outputted to any other data handling device as needed.

The processing of a detected low frequency signal typically involves comparing the detected signal to a standard signal, which is that detected signal recorded or expected in the presence of pipeline assembly 3 when in a standard or acceptable condition. The standard signal may be determined by actual measurements of similar pipelines known to be in standard condition, or from theoretical calculations based on known laws of electromagnetic induction. Additionally, the detected signal may be compared with a detected standard signal from a previous survey of the same pipeline to infer changes in the condition of the pipeline and to possibly predict future performance. The processing and interpretation of the data may also involve considering other influences on the detected signal, e.g., EM-conductive pipe supports and insulation, EM-conductive scale deposits, the fluid and/or fluid-entrained (EM conductive) solids flowing in the pipeline, and EM noise sources. In the preferred embodiment, the standard or reference signal is determined from actual measurements of pipelines known to be in standard, reference, or acceptable condition. If the standard signal is determined from theoretical calculations, software can be developed to process, analyze, display, and interpret the received data on an external computer.

The preferred battery or source of EM power 10 is a dry cell, gel cel or 12-volt lead-acid battery. Dry cell or gel cell battery power facilitates the portability and safe handling of the ring assembly. In alternative embodiments of the invention, the source of EM power can include a low frequency AC generator or an AC generator with a DC converter.

An example of the method of using the detector apparatus of the invention and of comparing the detected signal to a standard signal follows. The description is illustrative of many methods of practicing the invention and is not intended as limiting the scope of the invention as defined by the appended claims.

One of the semicircular elements 5a of ring assembly 2 is rotated or opened around hinge point 6 (as shown by the dotted element 5a in FIG. 1a) and the open ring assembly is placed around the pipe assembly 3 to be inspected. The opened semicircular element 5a is then rotated back around hinge point 6 to form a nearly closed, but discontinuous loop or ring-like shape around the pipe assembly 3. The circumferential orientation of the ring assembly 2 with respect to the pipe assembly 3 is noted so that it may be installed again at the same orientation, e.g., hinge 6 is located at a specified circumferential or clock location while the ring assembly is passed over the pipe assembly. Although centering of the ring assembly 3 around the pipe assembly is aided by closing the ring assembly, it is not necessary that the ring assembly be completely closed around the pipe assembly 2 or necessary that the ring assembly be substantially centered around the pipe assembly. For example, the partially open ring assembly can be in a position that is only roughly centered around the pipe assembly as long as the position is known and/or can be mostly replicated.

Using the rollers 12, the partially or nearly closed and centered ring assembly 2 is then manually rolled along the pipe insulation cover or jacket 4a at a speed of about 10 cm/sec while the signal generator 9 is generating a 100 to 1000 Hz source signal and the receiver/signal processor 11 is detecting and processing a resulting signal to provide a measurement of the average wall thickness of pipe 3a along at least a portion of the traversed distance. At a pipe assembly obstruction which prevents the closed ring assembly 2 from continuing to traverse the pipe assembly 3, e.g., at a pipe support, the axial location of ring assembly 2 with respect to the pipe 3a is noted, and a semicircular element 5a is partially or fully opened around hinge 6 to form a loop-like structure having a larger clearance thereby allowing the ring assembly to be passed over the obstruction while possibly obtaining thickness measurements. When the obstruction has been passed, the axial location of the ring assembly 2 with respect to the pipe 3a is again noted, the ring assembly returned to a noted, nearly closed position and circumferential orientation, and the traversing inspection continued.

The ring assembly 2 is energized with a periodic voltage signal and the current response is measured and stored by the receiving unit 11. If the ring assembly 2 were energized in free space, the only induction would be due to the self-inductance of the coil 5. If the energized ring assembly 2 substantially surrounds a pipe assembly 3 as shown in FIG. 1a, alternating currents are induced by Faraday's Law in the pipe metal and to a lesser extent, the sheet metal cladding 4a. These periodic, induced currents generate an alternating magnetic field, inducing counter-currents within the electrically conductive loop-like ring or wire coil 5 within the ring assembly 2. Thus, the total signal detected and received in the coil 5 (as shown in FIGS. 2a and 2b for thick pipe and thin pipe wall thicknesses) is the sum of the source signal and the counter-current secondary signal caused by the induced currents. The detected signal difference or departure from the source signal is a function of the inductance of the (EM conductive) cladding and pipeline near the ring, which in turn depends on factors such as the pipe/cladding composition, pipe/cladding thickness and surface conditions, and the geometrical orientation of the pipe/cladding with respect to the ring assembly 2. Changes in any of the dependent factors will lead to corresponding departures in the received signal. If the cladding properties are fixed over time and most of the pipe properties are fixed except for the erosive/corrosive thinning of the wall at the internal surface of the pipe, the resulting signal departure will be primarily dependent upon any change in the average thickness of the pipe wall.

Because the external pipe surface is not exposed to the handled corrosive/erosive fluid and may be protected from the atmosphere, e.g., by insulation 4 and cladding 4a, little or no changes are expected at the external pipe surface. In addition, the cladding 4a protects the insulation 4 and is typically resistant to atmospheric corrosion so that little or no changes are expected at the cladding or insulation surfaces. Although defects in the metal cladding may also be detected in the resulting signal, the defects are likely to be visible and/or unchanging and therefore the resulting signal can be corrected for these cladding defects. Thus, the only significant detectable changes over time are expected to be at the internal surface of the pipe, e.g., a reduction in pipe wall thickness is detectable as a change in the resulting detected and/or corrected signal.

The resulting signal detected by the receiver 11 can be compared to an actual prior thickness measurement when the pipe assembly 3 was in a safe or standard condition or compared to another "reference" signal representative of an acceptable thickness of the pipe wall. Alternatively, software in the receiver 11 can analyze the received signal, correcting for extraneous sources and signals, to output a number representative of the total pipe metal thickness in the vicinity of the ring, i.e., the average pipe thickness around the circumference of the pipe 3a near the ring assembly 2.

Both time-domain and frequency-domain operations are possible. In one type of time-domain operation (see FIG. 2a), the periodic or low-frequency source signal is an alternating square wave and the receiver 11 measures the time decay of the detected signal from its maximum source value. The more metal in the wall of pipe 3a, the more inductance and the slower the decay. (See thick pipe and thin pipe received signal traces in FIG. 2a.) In one type of frequency-domain operation (see FIG. 2b), the source signal is a low frequency sine wave and the receiver measures the phase shift and/or amplitude loss due to induction in the pipe wall metal. (See thick pipe and thin pipe received signal traces in FIG. 2b.)

To carry out an example survey of the average wall thickness of pipe 3a along a segment of pipe assembly 3, the ring assembly 2 is moved along the pipe assembly at a speed of about 10 cm/sec, continuously measuring and recording data. The rollers 12 and/or other centering and contacting means keep the ring assembly 2 properly oriented, aligned, and centered around the pipe assembly 3. The hinge 6 and optional connector 7 allow the discontinuous loop-like ring assembly to be partially opened and moved past larger obstacles such as pipe supports, protruding valves, etc. In the preferred embodiment, a device for measuring distance along the pipe is also used to correlate the thickness data with a location along the pipe. An example of such a device is galvanometer 8 built into one or more of the roller supports 12a with its output fed into the receiver 11.

Assuming the other factors which can alter the detected signal are held constant or are corrected for, the output of the survey is a continuous profile of total metal or other conductive materials in the vicinity of the ring assembly 2. Where the pipe is thinned, lower inductance will be observed. Real-time output and the segmented ring structure allow an operator to note excursions due to thinning at pipe joints, welds, valves, or other piping system irregularities and to take additional measurements if required. Although there is a portion of the detected signal associated with the insulation and metal cladding, this signal component will be constant as long as the cladding metal composition, thickness/surface condition, and proximity of the materials to the ring assembly 2 are constant and the ring assembly is centered on pipe assembly 3. Again, excursion due to exceptions of this type will typically be visible to, and noted or corrected by, an operator.

The inspection apparatus shown in FIGS. 1a and 1b requires no contact with the pipe 3a itself, avoiding the need to remove the insulation 4. The inspection method also allows wall thickness measurements of an operating piping system, i.e., a "live" pipeline. The method enables cost effective surveys of entire pipeline systems, most likely identifying small areas of suspected thinning for more detailed inspections, e.g., methods requiring removal of the insulation. More detailed inspection methods can include ultrasonic inspections, resistivity measurements, and physical dismantling of the pipeline to enable direct internal observation and caliper measurements.

The non-contact inspection apparatus of the invention is preferably used for "baseline" inspections of new pipeline systems so that post-service data and inspections using the apparatus can be compared to the baseline data. Comparisons allow the detection of deterioration even in areas where pipe supports, joints, or other metals are impacting the absolute accuracy of the measured average wall thickness.

The inventive inspection system can also be used with old pipeline systems, i.e., pipeline systems operating near or beyond their design life and requiring monitoring to assure continued safe operation. By inspecting when the old piping is "live" (i.e., pressurized) and also inspecting when it is not operating (i.e., unpressurized), some changes in pipe stress under pressure, unpressurized residual stress problems, and fatigue damage can be detected since some of these changes also impact inductance.

While the preferred embodiment of the inventive apparatus and method has been shown and described, and some alternative embodiments also shown and/or described, changes and modifications may be made thereto without departing from the invention. Accordingly, it is intended to embrace within the invention all such changes, modifications and alternative embodiments as fall within the spirit and scope of the appended claims.

What is claimed is:

1. An apparatus for inspecting the wall of a pipe having an external surface that is substantially covered by an insulation system, said apparatus comprising:

an electromagnetic element capable of forming at least a partial loop around said insulation system;

means for centering said electromagnetic element around said insulation system, wherein said means for centering contacts said insulation system;

means for traversing said electromagnetic element along said insulation system in a direction substantially coaxial with the centerline of said pipe;

means for generating a low-frequency EM source signal connected to said electromagnetic element;

means for detecting a resultant EM signal in or near said electromagnetic element; and means for correlating said resultant EM signal with the thickness of the wall of said pipe proximate to said electromagnetic element.

2. The apparatus of claim 1 wherein said insulation system comprises a thermal insulating material and a jacket composed of an EM conductive metal.

3. The apparatus of claim 1 wherein said electromagnetic element comprises:

a substantially semicircular first loop element;

a substantially semicircular second loop element; and a connector connecting said loop elements.

4. The apparatus of claim 3 wherein said connector comprises a hinge.

5. The apparatus of claim 3 wherein said means for traversing and said means for centering comprise a plurality of rollers rotatively attached to said electromagnetic element wherein said electromagnetic element is manually moveable.

6. The apparatus of claim 3 wherein said means for generating a low-frequency EM source signal comprises a square wave voltage generator.

7. The apparatus of claim 3 wherein said means for generating a low-frequency EM source signal comprises a sine wave generator.

8. The apparatus of claim 7 wherein said sine wave generator is capable of producing a source signal having a frequency of no greater than about 5000 Hz.

9. The apparatus of claim 7 wherein said sine wave generator produces source signals having a frequency of no greater than about 1000 Hz when said means for detecting is detecting said resultant EM signal.

10. The apparatus of claim 9 wherein said means for detecting comprises an EM signal receiver electrically connected to said electromagnetic element.

11. The apparatus of claim 10 wherein said means for correlating compares said resultant EM signal with a standard signal.

12. The apparatus of claim 1 wherein said electromagnetic element forms a nearly closed cylinder at a first axial position on said insulation system and is openable around said hinge to a more open cylinder, allowing the more opened electromagnetic element to pass over pipeline obstructions at other axial positions on said insulation system while detecting said resultant EM signal.

13. An apparatus for detecting thinning of the wall of a stationary pipe, said apparatus comprising:
    an openable, electromagnetic element capable of at least partially enclosing said stationary pipe;
    means for traversing said electromagnetic element in a direction coaxial with the centerline of said stationary pipe;
    means for centering said electromagnetic element around said stationary pipe as said electromagnetic element is traversing said stationary pipe;
    means for generating a periodic electromagnetic source signal proximate to said stationary pipe; and
    means for detecting a pipe-induced electromagnetic signal in said electromagnetic element, wherein said pipe-induced electromagnetic signal is dependent upon the wall thickness of said stationary pipe.

14. An apparatus for detecting thinning in the wall of an externally insulated pipe comprising:
    an openable electromagnetic element capable of partially closing around the outside of said externally insulated pipe;
    a roller device attached to said openable element, wherein said roller device centers said element around the outside of said externally insulated pipe while said element traverses said pipe in a direction coaxial with the centerline of said pipe;
    an electromagnetic source signal generator electrically connected to said openable element;
    a detector for detecting a pipe-induced electromagnetic signal in said openable element; and
    a signal processor for correlating said detected electromagnetic signal with the thickness of said externally insulated pipe.

15. The apparatus of claim 14 wherein said externally insulated pipe comprises a steel pipe having external thermal insulation substantially covered by a metal jacket, and said source signal generator is capable of producing a periodic source signal having a frequency of no more than 250 Hz.

16. A process for inspecting the wall of an externally insulated, EM conductive pipe, said process comprising:
    placing a loop-like electromagnetic element around at least a portion of said externally insulated pipe;
    moving said loop-like element over said externally insulated pipe in a direction substantially parallel to the centerline of said pipe;
    generating a low-frequency EM source signal proximate to said externally insulated pipe;
    detecting a resulting EM signal; and
    correlating said resulting EM signal with the wall thickness of said pipe.

17. The process of claim 16 which also comprises the step of at least partially opening said loop-like element and detecting a resulting signal in the opened loop.

18. The process of claim 16 wherein said low frequency EM source signal is electrically connected to said loop-like element.

19. The process of claim 18 wherein said resulting EM signal is detected in said loop-like element.

20. The process of claim 16 which also comprises the step of detecting an ultrasonic signal after said correlating step.

21. The process of claim 16 wherein said loop-like element is moved over said externally insulated pipe at an average speed of no more than about 10 cm/sec.

22. The process of claim 16 wherein said EM conductive pipe is substantially composed of steel and said source signal has a frequency between about 1 and about 1000 Hz.

* * * * *